United States Patent [19]
Matsubayashi

[11] Patent Number: 5,481,626
[45] Date of Patent: Jan. 2, 1996

[54] NUMERICAL EXPRESSION REOGNIZING APPARATUS

[75] Inventor: Kazuhiro Matsubayashi, Yokohama, Japan

[73] Assignee: Canon Kabushiki Kaisha, Tokyo, Japan

[21] Appl. No.: 264,752

[22] Filed: Jun. 23, 1994

Related U.S. Application Data

[63] Continuation of Ser. No. 959,470, Oct. 9, 1992, abandoned, which is a continuation of Ser. No. 865,686, Apr. 8, 1992, abandoned, which is a continuation of Ser. No. 226,820, Aug. 1, 1988, abandoned.

[30] Foreign Application Priority Data

Aug. 5, 1987 [JP] Japan .................................. 62-194311

[51] Int. Cl.⁶ ..................................................... G06K 3/00
[52] U.S. Cl. .......................... 382/189; 382/292; 382/315; 364/709.07; 364/709.11
[58] Field of Search .................... 382/1, 13, 47, 382/59, 189, 292, 315; 364/709.01, 709.07, 709.08, 709.11; 345/180

[56] References Cited

U.S. PATENT DOCUMENTS

| | | | |
|---|---|---|---|
| 4,070,649 | 1/1978 | Wright, Jr. et al. | 340/146.3 |
| 4,641,354 | 2/1987 | Fukunaga | 382/13 |
| 4,903,315 | 2/1990 | Peppers et al. | 382/47 |

FOREIGN PATENT DOCUMENTS

| | | |
|---|---|---|
| 0206829 | 12/1986 | European Pat. Off. . |
| 0254561 | 1/1988 | European Pat. Off. . |
| 2025105 | 1/1980 | United Kingdom . |
| 2193023 | 1/1988 | United Kingdom . |

OTHER PUBLICATIONS

"A Syntatic Approach for Handwritten Math. Formula Recogn.", Belaid, et al. IEEE Trans. on Pattern Analysis and Machine Intell., vol. 6, No. 1, Jan. 1984, pp. 105–111.

*Primary Examiner*—Leo H. Boudreau
*Assistant Examiner*—Christopher Kelley
*Attorney, Agent, or Firm*—Fitzpatrick, Cella, Harper & Scinto

[57] ABSTRACT

A numerical expression recognizing apparatus for recognizing a handwritten numerical expression and outputting it as a code train. This apparatus includes: a coordinates input apparatus for inputting a numerical expression consisting of characters including numerals and signs by coordinates; a recognition circuit for recognizing the characters including the numerals and signs and constructing the numerical expression on the basis of a set of the coordinates which were input by the coordinates input apparatus; and an output control circuit for outputting the pattern of the numerical expression constructed by the characters on the basis of the coordinates which were input by the coordinates input apparatus and the characters recognized by the recognition circuit. The pattern of the numerical expression is displayed by a liquid crystal display. The recognition circuit has a converter to convert the characters constructing the numerical expression which were input by the coordinates input apparatus into the code information. With this apparatus, a numerical expression including a fraction, a power, a square root, or the like can be directly easily input in accordance with the expressing method which is ordinarily used in mathematics in a manner similar to one's handwriting.

26 Claims, 23 Drawing Sheets

FIG.2

| KIND OF CHR | CHR | CLASS |
|---|---|---|
| NUMERAL | 0 1 2 3 4 5 6 7 8 9 | SIZE-DETERMINED CHR |
| OPERATOR | + × ÷ | SIZE-DETERMINED CHR |
| EQUALITY SIGN | = | SIZE-DETERMINED CHR |
| DECIMAL POINT | . | SIZE-UNDETERMINED CHR |
| LATERAL BAR | — | SIZE-UNDETERMINED CHR |
| ROOT SIGN | √ | SIZE-UNDETERMINED CHR |
| PARENTHESES | ( ) | SIZE-UNDETERMINED CHR |

FIG.3

| ADDRESS | DATA |
|---|---|
| 1000 | CODE (1) |
| 1001 | x (1) |
| 1002 | y (1) |
| 1003 | Dx (1) |
| 1004 | Dy (1) |
| 1005 | CODE (2) |
| 1006 | x (2) |
| 1007 | y (2) |
| 1008 | Dx (2) |
| 1009 | Dy (2) |
| 100A | CODE (3) |
| ⋮ | ⋮ |

FIG.4

| KIND OF OPERATION | HANDWRITTEN NUMERICAL FORMULA | CHR TRAIN OUTPUT |
|---|---|---|
| ADDITION | $12 + 34$ | $12 + 34$ |
| SUBTRACTION | $12 - 34$ | $12 - 34$ |
| MULTIPLICATION | $12 \times 34$ | $12 \times 34$ |
| DIVISION | $12 \div 34$ | $12 \div 34$ |
| FRACTION | $\frac{12}{34}$ | $(12) \div (34)$ |
| POWER | $12^{34}$ | $12 \wedge 34$ |
| SQUARE ROOT | $\sqrt{12}$ | $\sqrt{\,}(12)$ |

FIG.5

$1 + 2 - 3 \times 4 \div 5 =$

FIG.6

| i | CODE(i) | x(i) | y(i) | Dx(i) | Dy(i) |
|---|---------|------|------|-------|-------|
| 1 | "1" | 20 | 20 | 16 | 16 |
| 2 | "+" | 36 | 21 | 16 | 16 |
| 3 | "2" | 53 | 20 | 16 | 16 |
| 4 | "−" | 70 | 29 | 15 | 1 |
| 5 | "3" | 87 | 21 | 16 | 16 |
| 6 | "×" | 102 | 22 | 16 | 16 |
| 7 | "4" | 119 | 20 | 16 | 16 |
| 8 | "÷" | 134 | 20 | 16 | 16 |
| 9 | "5" | 151 | 19 | 16 | 16 |
| 10 | "=" | 167 | 22 | 16 | 16 |

FIG.7

| ADDRESS | DATA |
|---|---|
| 2000 | "1" |
| 2001 | "+" |
| 2002 | "2" |
| 2003 | "−" |
| 2004 | "3" |
| 2005 | "×" |
| 2006 | "4" |
| 2007 | "÷" |
| 2008 | "5" |
| 2009 | "=" |

| i | CODE(i) | x(i) | y(i) | Dx(i) | Dy(i) |
|---|---|---|---|---|---|
| 1 | "−" | 20 | 60 | 80 | 1 |
| 2 | "1" | 32 | 40 | 16 | 16 |
| 3 | "−" | 40 | 82 | 45 | 1 |
| 4 | "−" | 52 | 48 | 17 | 1 |
| 5 | "3" | 52 | 62 | 16 | 16 |
| 6 | "4" | 55 | 85 | 16 | 16 |
| 7 | "2" | 72 | 40 | 16 | 16 |
| 8 | "=" | 108 | 52 | 16 | 16 |

FIG.10

| ADDRESS | DATA |
|---|---|
| 2000 | "(" |
| 2001 | "1" |
| 2002 | "−" |
| 2003 | "2" |
| 2004 | ")" |
| 2005 | "÷" |
| 2006 | "(" |
| 2007 | "(" |
| 2008 | "3" |
| 2009 | ")" |
| 200A | "÷" |
| 200B | "(" |
| 200C | "4" |
| 200D | ")" |
| 200E | ")" |
| 200F | "=" |

| i | CODE(i) | x(i) | y(i) | Dx(i) | Dy(i) |
|---|---|---|---|---|---|
| 1 | "(" | 12 | 42 | 8 | 28 |
| 2 | "2" | 24 | 50 | 16 | 16 |
| 3 | "3" | 41 | 46 | 8 | 8 |
| 4 | ")" | 50 | 42 | 8 | 28 |
| 5 | "−" | 62 | 44 | 6 | 1 |
| 6 | "4" | 70 | 40 | 8 | 8 |
| 7 | "=" | 79 | 50 | 16 | 16 |

FIG.13

| ADDRESS | DATA |
|---|---|
| 2000 | "(" |
| 2001 | "2" |
| 2002 | "^" |
| 2003 | "(" |
| 2004 | "3" |
| 2005 | ")" |
| 2006 | ")" |
| 2007 | "^" |
| 2008 | "(" |
| 2009 | "−" |
| 200A | "4" |
| 200B | ")" |
| 200C | "=" |

FIG.14

$$\sqrt{1+2} - 3 =$$

FIG.15

| i | CODE(i) | x(i) | y(i) | Dx(i) | Dy(i) |
|---|---------|------|------|-------|-------|
| 1 | "√" | 18 | 34 | 68 | 26 |
| 2 | "1" | 32 | 40 | 16 | 16 |
| 3 | "+" | 44 | 40 | 16 | 16 |
| 4 | "2" | 63 | 40 | 16 | 16 |
| 5 | "−" | 88 | 48 | 13 | 1 |
| 6 | "3" | 104 | 41 | 16 | 16 |
| 7 | "=" | 123 | 40 | 16 | 16 |

| ADDRESS | DATA |
|---|---|
| 2000 | "√" |
| 2001 | "(" |
| 2002 | "1" |
| 2003 | "+" |
| 2004 | "2" |
| 2005 | ")" |
| 2006 | "−" |
| 2007 | "3" |
| 2008 | "=" |

NUMERICAL EXPRESSION REOGNIZING APPARATUS

This application is a continuation of application Ser. No. 07/959,470 filed Oct. 9, 1992, now abandoned, which is a continuation of application Ser. No. 07/865,686 filed Apr. 8, 1992, now abandoned, which is a continuation application of application Ser. No. 07/226,820 filed Aug. 1, 1988, now abandoned.

BACKGROUND OF THE INVENTION

1. Field of the Invention

The present invention relates to a numerical expression recognizing apparatus and, more particularly, to a numerical expression recognizing apparatus in which, when a handwritten numerical expression is input, the numerical expression is recognized and output as a code train.

2. Related Background Art

Hitherto, in general, a numerical expression input apparatus in a computer or the like has comprised keys corresponding to each numeral, operator, and the like. In recent years, there has been developed a numerical expression input apparatus including means for recognizing a handwritten character and having a function to recognize character codes such as a handwritten input numeral, an operator, and the like. Even in a computer using any one of those input apparatuses, when the next process is executed in an arithmetic operating unit or the like, the process is performed by sequentially analyzing the input keys or character codes.

However, there is the drawback such that when a numerical expression is input by using keys in the foregoing conventional apparatus, such a key inputting operation is difficult for a person who is inexperienced in handling the keys.

In addition, there is the drawback such that when processing a numerical expression based on only the inputting sequence of numerals, operators, and the like in a computer, since it is impossible to input information regarding the positional relation and sizes of numerals, operators, and the like, which are the important elements when a human being writes a numerical expression onto a paper or the like, that information must be input after the human being previously executed a converting process such that the human being devised the calculating sequence or inputted special signs.

SUMMARY OF THE INVENTION

It is the first object of the invention to provide a numerical expression recognizing apparatus in which when a handwritten numerical expression is input, the numerical expression is recognized and output as a code train.

The second object of the invention is to provide a numerical expression recognizing apparatus in which a handwritten numerical expression which is input by a coordinates input apparatus is correctly recognized and output as a pattern of the numerical expression.

The third object of the invention is to provide a numerical expression recognizing apparatus in which a handwritten numerical expression which is input by a coordinates input apparatus is recognized and the result of the arithmetic operation is output.

BRIEF DESCRIPTION OF THE DRAWINGS

FIG. 2 is a diagram showing characters to be recognized in the first embodiment;

FIG. 3 is a diagram showing forms in an RAM of data indicative of the code, the position, and the size of each character recognized;

FIG. 4 is a diagram showing arithmetic operations which are executed in the first embodiment;

FIG. 5 is a diagram showing a state in which an example of a handwritten numerical expression of a root calculation of addition, subtraction, multiplication, and division was written on a tablet;

FIG. 6 is a diagram showing the data indicative of the code, the position, and the size of each character in the numerical expression of FIG. 5;

FIG. 7 is a diagram showing forms in an RAM of a code train produced on the basis of the data of FIG. 6;

FIG. 10 is a diagram showing forms in the RAM of a code train produced on the basis of the data of FIG. 9;

FIG. 13 is a diagram showing forms in the RAM of a code train produced on the basis of the data of FIG. 12;

FIG. 14 is a diagram showing a state in which an example of a handwritten numerical expression including a square root was written on the tablet;

FIG. 15 is a diagram showing the data indicative of code, position, and size of each character in the numerical expression in FIG. 14;

FIG. 31 is a diagram showing an example of a calculation using variables and functions in a numerical expression recognizing apparatus in the second embodiment.

DETAILED DESCRIPTION OF THE PREFERRED EMBODIMENTS

Figure 1A:
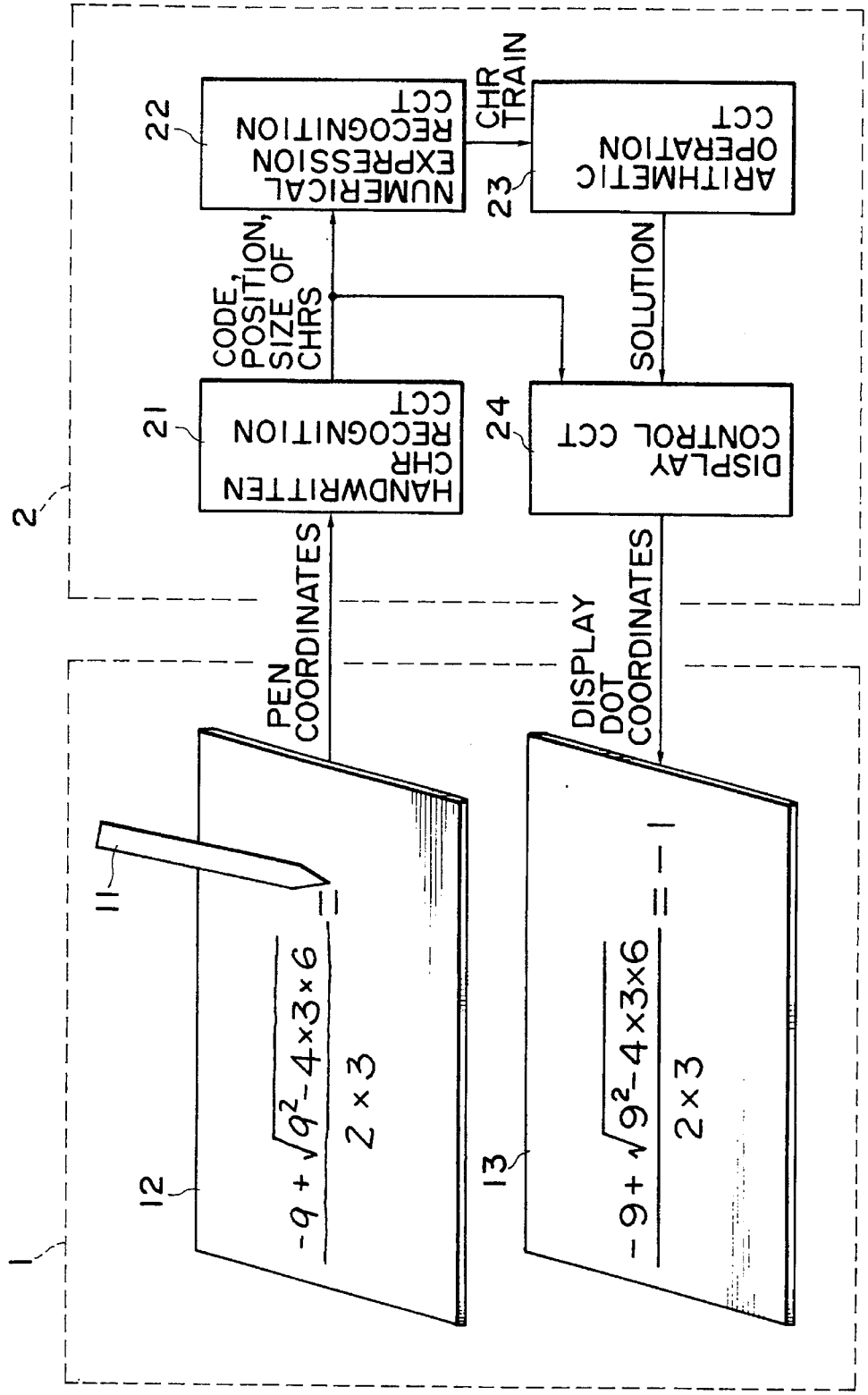
FIG. 1(A) is a block diagram of a numerical expression recognizing apparatus of the first embodiment according to the present invention.

FIG. 1(A) is a block diagram of a numerical expression recognizing apparatus of an embodiment. In this embodiment, an explanation will be provided with respect to an example of an apparatus for recognizing a numerical expression and executing arithmetic operations on the basis of the result of the recognition. However, the result of the recognition is not limited to use in recognizing arithmetic operations. A numerical expression which has once been recognized can be also used for conversion into another numerical expression, for production of a new numerical expression, or the like. On the other hand, only a part of operators are shown in the embodiment and the embodiment can be also similarly applied to other operators.

In FIG. 1(A), reference numeral 1 denotes a handwritten coordinates input apparatus in which an input apparatus and an output apparatus are integrally constructed. The coordinates input apparatus 1 comprises a pen 11, a tablet 12, and a liquid crystal display (LCD) 13. The tablet 12 is a well-known input apparatus of the ultrasonic system or the like. The tablet 12 consists of a coordinates plane in which the left upper point of the tablet is set to an origin and which has a range of x coordinates of 0 to 255 and y coordinates of 0 to 127. When an arbitrary position on the tablet 12 is touched by using the pen 11, the coordinates values of this position are output to the outside. On the other hand, when arbitrary coordinates values are input from the outside, a dot is displayed at this position on the LCD 13.

A microcomputer 2 comprises: a handwritten character recognition circuit 21; a numerical expression recognition circuit 22; an arithmetic operation circuit 23; and a display control circuit 24.

Figure 1B:
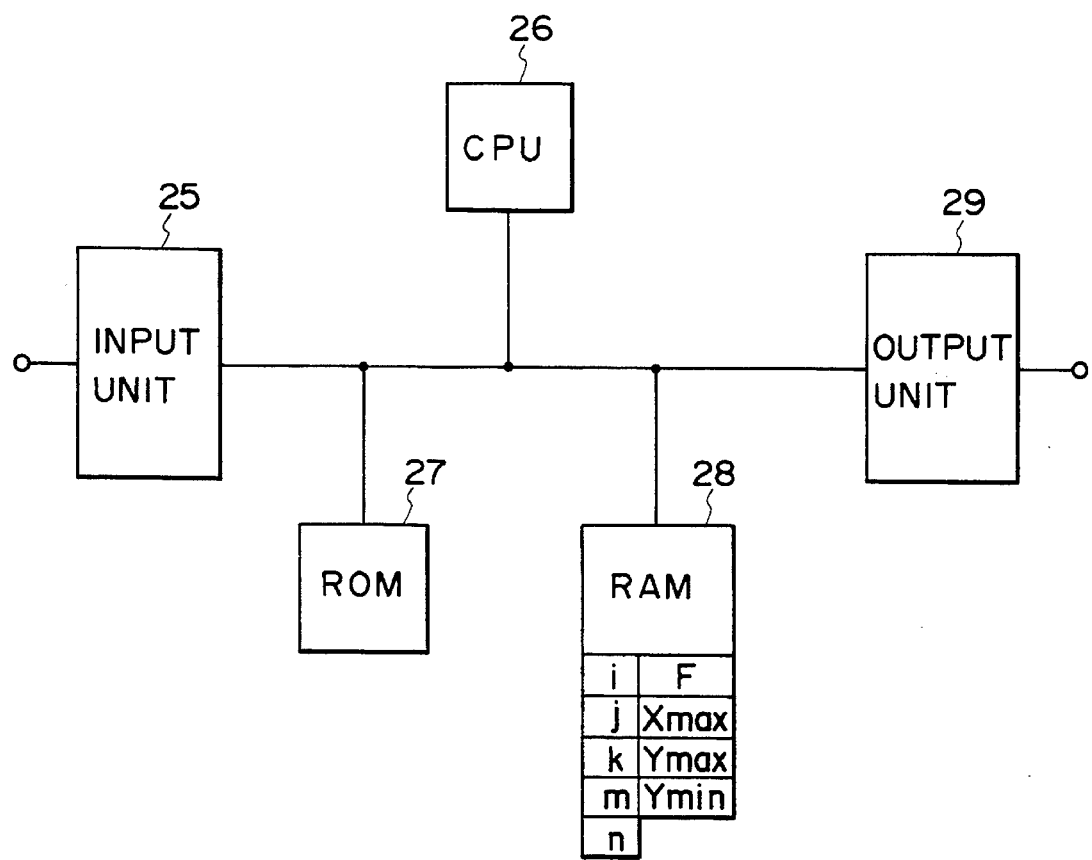
FIG. 1(B) is a constitutional diagram showing an arrangement of a microcomputer of the embodiment.

FIG. 1(B) shows an example of an arrangement of a hardware of the microcomputer 2. The microcomputer comprises: an input unit 25 which receives an input from the coordinates input apparatus 1; a CPU 26 to execute various kinds of processes in accordance with a program; an ROM 27 to store dictionaries for recognition of characters and numerical expressions and various kinds of processing programs, which will be explained hereinafter; an RAM 28 for auxiliary storage which is used to recognize characters and numerical expressions and to execute arithmetic operations; and an output unit 29 to output data to the display 13 of the coordinates input apparatus 1.

First, the function of the handwritten character recognition circuit 21 will be described. When characters (including numerals and symbols) are written on the tablet 12 by the pen 11, the coordinates values of each point constituting the characters are sequentially stored into the RAM 28 in the microcomputer 2. After the elapse of a predetermined time after the pen 11 had been away from the tablet 12, it is regarded that the input of one character was finished, so that the recognition of the character is started.

First, the character is recognized on the basis of a set of the foregoing coordinates values stored in the RAM 28 and is converted into the code information. As a recognizing method, it is possible to use any one of well-known methods such as a vector recognizing method or the like. In this embodiment, the characters shown in FIG. 2 are recognized. Each of the characters is classified into either the size-determined character or the size-undetermined character. The size-determined characters include: numerals "0" to "9"; an addition sign "×"; a multiplication sign "×"; a division sign "÷"; and an equality sign "=". The fonts each consisting of sixteen dots in the vertical and lateral directions (hereinafter, these fonts are referred to as 16-dot fonts) and the fonts each consisting of eight dots in the vertical and lateral directions (hereinafter, these fonts are referred to as 8-dot fonts) are stored in the ROM 27. If the character recognized is the size-determined character, the following processes are executed.

In the set of the coordinates values derived by the foregoing handwriting operations, the minimum value of the x coordinate assumes $x_{min}$, the maximum value of the x coordinate assumes $x_{max}$, the minimum value of the y coordinate assumes $y_{min}$, and the maximum value of the y coordinate assumes $y_{max}$. In this case, if at least one of the values of $(x_{max}-x_{min})$ and $(y_{max}-y_{min})$ is twelve or more, the 16-dot font is selected. If not, the 8-dot font is selected. However, the 16-dot font is always selected for the equality sign "=". The 8-dot font is used when expressing an exponent in a power. Next, the coordinates to display a font are determined in a manner such that the x and y coordinates of the center of the font are respectively set to $$\frac{x_{min} + x_{max}}{2}, \frac{y_{min} + y_{max}}{2}$$

The font selected from the ROM 27 by the display control circuit 24 is displayed onto the liquid crystal display 13. On the other hand, the size-undetermined characters include: a decimal point "."; a lateral bar "−"; a root sign "√"; and parentheses "(" and ")". Each of the size-undetermined character does not have a predetermined size. The lateral bar "−" is commonly used as a minus sign, subtraction sign, and fraction bar.

If the recognized character is the size-undetermined character, the following processes are executed. In the set of the coordinates values obtained by the handwriting operations mentioned above, the minumum value of the x coordinate assumes $x_{min}$, the maximum value of the x coordinate assumes $x_{max}$, the minimum value of the y coordinate assumes $y_{min}$, and the maximum value of the y coordinate assumes $y_{max}$. In place of the fonts, vector information is stored in the ROM 27 for the size-undetermined characters. The display control circuit 24 constructs a character on the basis of the vector information and displays on the LCD 13 in a manner such that the coordinates at the left edge, right edge, upper edge, and lower edge of the character which is displayed coincide with $x_{min}$, $x_{max}$, $y_{min}$, and $Y_{max}$, respectively.

In the size-determined character or size-undetermined character, when the code, position, and size of the character to be displayed are decided, a code CODE(i) of the character, an x coordinate x(i) at the left edge of the character, a y coordinate y(i) at the upper edge of the character, a number of dots $D_x(i)$ in the x direction of the character, and a number of dots $D_y(i)$ in the y direction of the character are stored into the RAM 28.

The foregoing operations are repeated and each time characters are input one by one from the tablet 12, the recognized characters are displayed on the LCD 13. The values of CODE(i), x(i), y(i), $D_x(i)$, and $D_y(i)$ are rearranged in accordance with the sequence from the data of the character whose value of x(i) is small, that is, the data of the character written on the left side and are stored into the RAM 28 on the basis of forms shown in FIG. 3. When the equality sign "=" has finally been input, the processing routine advances to the numerical expression recognition circuit 22.

The process of the numerical expression recognition circuit 22 will now be explained. In this embodiment, integers and decimals which are expressed by numerals, positive and negative signs, and decimal point are processed as numbers. On the other hand, as shown in FIG. 4, the arithmetic operations of addition, subtraction, multiplication, division, fraction, power, and square root are processed on the basis of expressions which are ordinarily used in the mathematics. In addition, parentheses can be also used to change the sequence of the arithmetic operations.

The addition, subtraction, multiplication, and division will be first described.

When the addition, subtraction, multiplication, and division of integers and decimals, and their mixed calculation are expressed on the hand, they are generally written by one line. The respective arithmetic operations have the priorities and are calculated in accordance with the sequence of the calculation in the parentheses, multiplication and division, and the addition and subtraction. If the arithmetic operations have the same priority, they are calculated from the left. In such a numerical expression which is written on one line, a method whereby by sequentially inputting the characters to the arithmetic operation circuit 23 from the character on the left side, the arithmetic operation circuit 23 discriminates the priorities and executes the calculation as is well known in, for example, a BASIC interpreter of a computer language or the like. Therefore, in the case of the mixed calculations of the addition, subtraction, multiplication, and division, it is sufficient that the handwritten characters are rearranged in accordance with the sequence from the character on the left side and are output.

Since the CODE(i) stored in the RAM 28 by the handwritten character recognition circuit 21 are arranged in accordance with the sequence from the CODE(i) having a smaller x(i), it is sufficient that the CODE(i) are sequentially taken out and output as a code train. However, in the foregoing size-determined character, when the values of $D_x(i)$ and $D_y(i)$ are 8, it corresponds to the 8-dot font and expresses an exponent. Therefore, the calculation of the power must be performed by the process, which will be explained hereinlater. On the other hand, since the negative sign and subtraction sign are commonly used as the fraction bar, a check must be made to see if the character indicates the negative sign or subtraction sign by the process, which will be described hereinbelow. The positive sign and addition sign are output without discriminating them. The negative sign and subtraction sign are also output without discriminating them.

FIGS. 5, 6, and 7 show an example of mixed calculations of addition, subtraction, multiplication, and division. When the numerical expression shown in FIG. 5 is written onto the tablet 12 by the pen 11, data shown in FIG. 6 are obtained by the handwritten character recognition circuit 21. On the basis of these data, the numerical expression recognition circuit 22 outputs a code train to the RAM 28 in accordance with forms shown in FIG. 7. The arithmetic operation circuit 23 receives the code train, determines the priorities of the arithmetic operations, calculates the arithmetic operations, and outputs the solution. The solution is displayed on the LCD 13 by the display control circuit 24, so that the function as a calculator is accomplished.

A fraction will now be described. The fraction is another expression of the division and the following conversion can be performed.

$$\frac{A}{B} \rightarrow (A') \div (B')$$

Where, A and B denote arbitrary handwritten numerical expressions and A' and B' represent code trains produced from the numerical expressions A and B, respectively.

First, only the characters existing at the position of numerator, i.e., above the fraction bar are extracted and the numerical expression A is constructed. If numerical expression A relates to mixed calculations of the addition, subtraction, multiplication, and division, a method of producing the code train A' from the numerical expression A has already been described. When the numerical expression A includes a fraction, the process regarding the fraction is recursively executed. In this case, although the fraction bar is generally written earlier than the numerical expressions A and B, even when the writing sequence is undetermined, the processing sequence of the fraction bar can be decided by selecting the fraction bar which is longer in the x direction among the fraction bars whose x coordinates overlap. On the other hand, even when the numerical expression A includes a power or a square root, which will be explained hereinlater, the code train A' can be also obtained by executing the relevant process.

In a manner similar to the above, only the characters existing at the position of the denominator, i.e., below the fraction bar are extracted and the numerical expression B is constructed and the code train B' is produced. The code train A' and code train B' are respectively sandwiched by parentheses and are coupled by the division sign "÷", so that the code train indicative of a fraction can be produced. When no character exists at the positions of the numerator and denominator for the lateral bar, this lateral bar is regarded as a negative sign or a subtraction sign instead of a fraction bar.

Figures 8, 9:
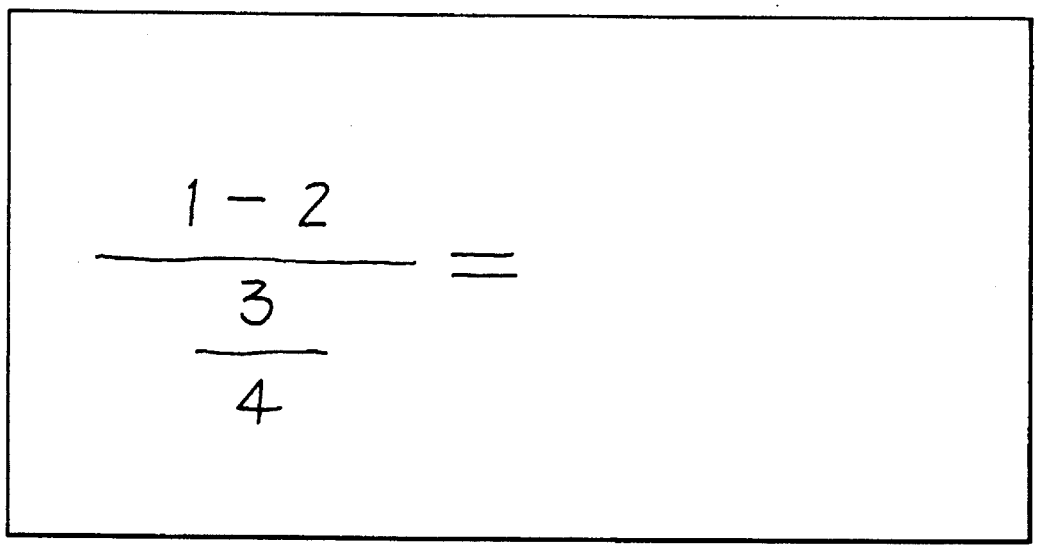
FIG. 8 is a diagram showing a state in which an example of a handwritten numerical expression including fractions was written on the tablet.
FIG. 9 is a diagram showing the data indicative of code, position, and size of each character in the numerical expression in FIG. 8.

FIGS. 8, 9, and 10 show an example of the calculation including fractions. When a numerical expression shown in FIG. 8 is written on the tablet 12 by the pen 11, data as shown in FIG. 9 are obtained by the handwritten CHR recognition circuit 21. On the basis of these data, the numerical expression recognition circuit 22 outputs the code train to the RAM 28 on the basis of forms shown in FIG. 10. In a manner similar to the case of the mixed calculations of the addition, subtraction, multiplication, and division mentioned above, the solution is calculated by this code train and displayed on the LCD 13.

An explanation will now be provided with respect to a power. In this embodiment, 8-dot fonts are used for numerals and operators in the power portion and 16-dot fonts are used for the other numerals and operators. As mentioned above, when characters are handwritten, if a large character is written, the 16-dot font is displayed, and if a small character is written, the 8-dot font is displayed. In the case of the character of the 16-dot font, $D_x(i)=D_y(i)=16$. In the case of the character of the 8-dot font, $D_x(i)=D_y(i)=8$. On the other hand, the following rules are applied for the size-undetermined characters. That is, for the size-undetermined characters other than the final parenthesis ")", if the size-determined character which is first extracted after that relates to the 8-dot font, this size-undetermined character belongs to the power portion. If it is the 16-dot font, this size-undetermined character belongs to the portion other than the power. On the other hand, the final parenthesis ")" has the same attribute as that of the initial parenthesis "(" which constitutes a pair of parentheses together with the final parenthesis ")".

In this embodiment, in order to express the power by a code train, a power operator "^" is used and the following conversion is executed.

$$C_D \rightarrow C'^{(D')}$$

Where, C denotes an arbitrary numerical expression and D represents an arbitrary expression including no power. C' and D' denote code trains produced from the expressions C and D, respectively.

While a code train is being produced, when a character belonging to the power portion comes subsequently to a character which belongs to the portion other than the power, the power sign "^" and initial parenthesis "(" are inserted. On the other hand, when a character belonging to the portion other than the power comes subsequently to a character which belongs to the power portion, the final parenthesis ")" is inserted. A method whereby in the arithmetic operation circuit 23, the mixed calculations of the power sign "^" and the addition, subtraction, multiplication, and division are executed by using the power sign "^" in a manner similar to the other operators is well known. The priorities of the arithmetic operations in this case are set to the sequence of the portion in the parentheses, power, multiplication and division, and addition and subtraction. If the arithmetic operations have the same priority, they are calculated from the left.

Figures 11, 12:
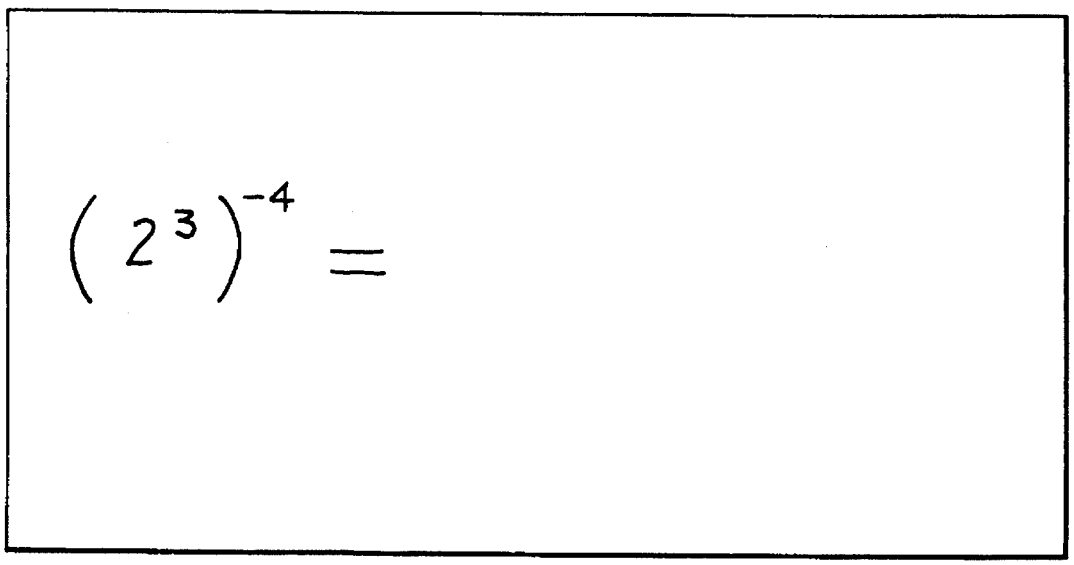
FIG. 11 is a diagram showing a state in which an example of a handwritten numerical expression including powers was written on the tablet.
FIG. 12 is a diagram showing the data indicative of code, position, and size of each character in the numerical expression of FIG. 11.

FIGS. 11, 12, and 13 show an example of the calculations including a power. When a numerical expression shown in FIG. 11 is written on the tablet 12 by the pen 11, data as shown in FIG. 12 are obtained by the handwritten CHR recognition circuit 21. On the basis of these data, the numerical expression recognition circuit 22 outptus the code train to the RAM 28 on the basis of forms shown in FIG. 13. In a manner similar to the case of the mixed calculations of the addition, subtraction, multiplication, and division mentioned before, the solution is calculated by this code train and displayed on the LCD 13.

A square root will now be explained. In this embodiment, in order to express a square root by a code train, the following conversion is executed.

$$\sqrt{E} \rightarrow \sqrt{(E')}$$

Where, E denotes an arbitrary numerical expression and E' indicates a code train produced from the numerical expression E. Only the characters existing at the position in the root sign are extracted and the numerical expression E is constructed. The code train E' is produced from the numerical expression E by the foregoing method.

If the numerical expression E includes a square root, the process regarding the square root is recursively executed. Although the square root is generally written earlier than the numerical expression E, even when the sequence is undetermined, when the x coordinates overlap, by selecting the root which is longer in the x direction, the processing sequence of the square roots can be decided. By sandwiching the code train E' by the parentheses and coupling after the root sign "√", the code train indicative of the square root can be produced. In the arithmetic operation circuit 23, a method of executing the mixed calculations of the square root arithmetic operation and the addition, subtraction, multiplication, division, or power is well known. In this case, the priorities of the arithmetic operations are set to the sequence of the portion in the parentheses, square root, power, multiplication and division, and addition and subtraction. If the arithmetic operations have the same priority, they are calculated from the left.

Figures 16, 17:
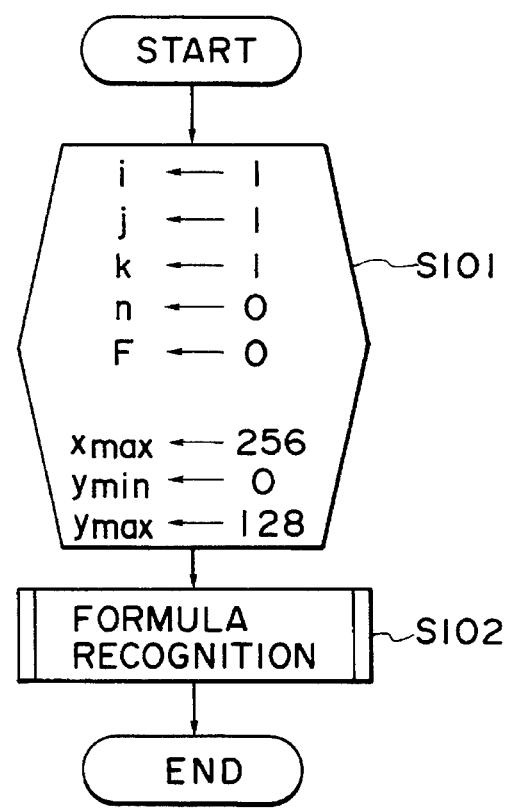
FIG. 16 is a diagram showing forms in the RAM of a code train produced on the basis of the data of FIG. 15.
FIG. 17 is a flowchart for a main routine of the processes of the numerical expression recognizing apparatus of the first embodiment.

FIGS. 14, 15, and 16 show an example of the calculations including a square root. When a numerical expression shown in FIG. 14 is written on the tablet 12 by the pen 11, data as shown in FIG. 15 are obtained by the handwritten CHR recognition circuit 21. On the basis of these data, the numerical expression recognition circuit 22 outputs a code train to the RAM 28 on the basis of forms shown in FIG. 16. In a manner similar to the case of the mixed calculations of the addition, subtraction, multiplication, and division mentioned above, the solution is calculated by this code train and displayed on the LCD 13.

The recognition of a numerical expression in this embodiment will now be described further in detail with reference to flowcharts shown in FIGS. 17 to 30. In this embodiment, as shown in FIG. 3, the data of the characters are rearranged in accordance with the sequence from the data of the character written on the left side and are stored in the RAM 28. Therefore, a fraction bar and a root sign are automatically input earlier than the numerical expression included in this range. Therefore, a user does not need to consider the inputting sequence.

FIG. 17 shows a main routine. In the first step S101, initial values are substituted for variables of i, j, k, n, F, $x_{max}$, $y_{min}$, and $Y_{max}$. i denotes a pointer indicative of a character which is at present being processed in the input data. On the other hand, the position at which a new character code is added to the output code trains S(1), S(2), . . . is generally set to the final position of each code train. k denotes a pointer indicative of this position. However, there is also a case where a character code is inserted into the code train and j represents a pointer indicative of the inserting position in this case. n denotes the number of stages of the nesting of the parentheses; F indicates a flag indicative of the power portion; $x_{max}$ is the maximum value of the x coordinate to designate a region to recognize a numerical expression; $y_{min}$ the minimum value of the y coordinate likewise; and $y_{max}$ the maximum value of the y coordinate similarly.

In the next step S102, a formula existing in the region is recognized. Since the whole formula is included in the region in the main routine, the whole formula is recognized in this step.

Figure 18:
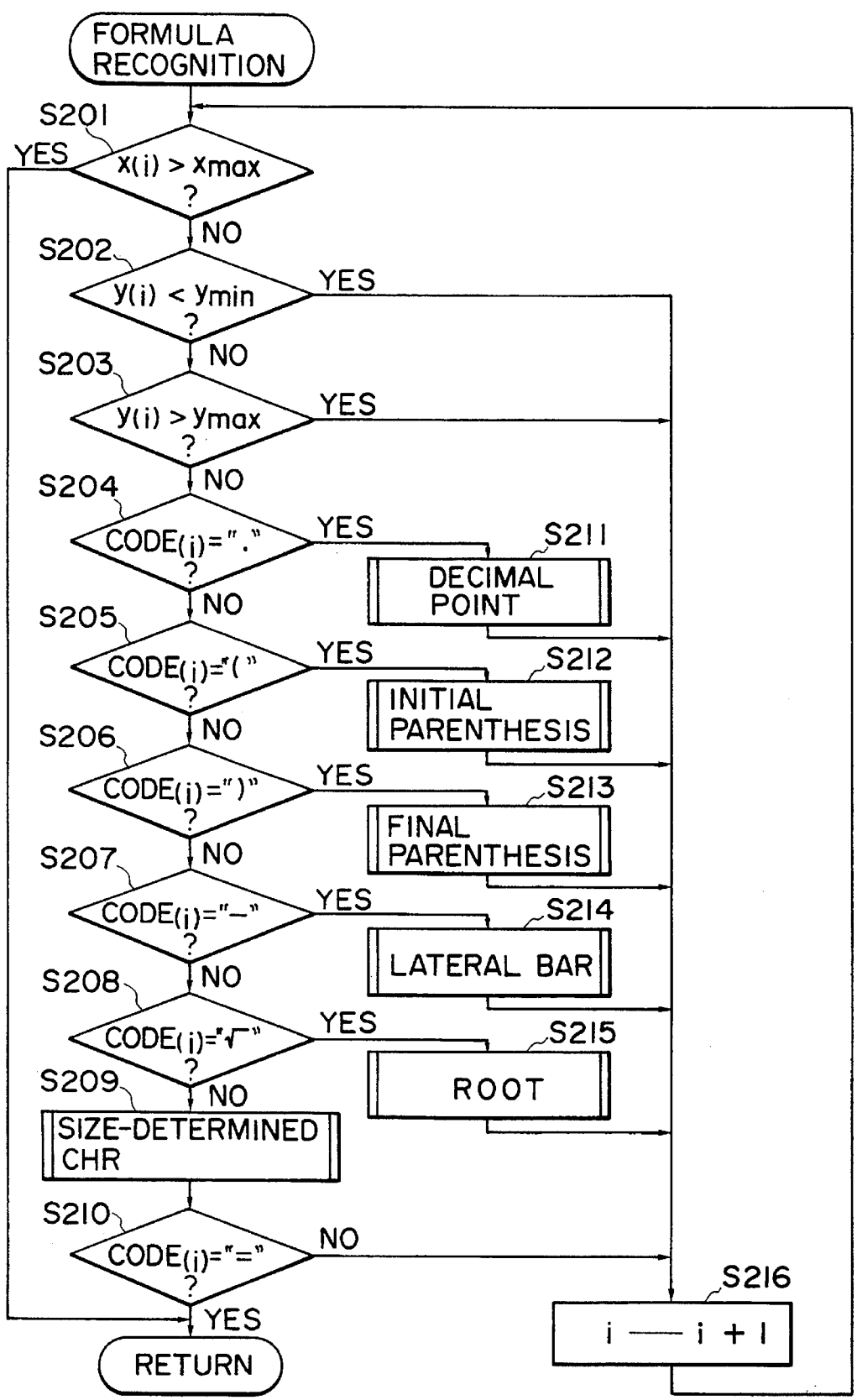
FIG. 18 is a flowchart for a processing routine of formula recognition.

FIG. 18 shows a processing routine for a formula recognition. The formula recognition routine is accessed not only in the main routine but also in the recognition of formulae in the numerator, denominator, and root sign.

In the first step S201, if x(i) is larger than $x_{max}$, the characters after the CODE(i) are not of the region and the formula recognition is finished. On the contrary, when x(i) is not larger than $x_{max}$, step S202 follows. If y(i) is smaller than $y_{min}$ in step S202 or if y(i) is larger than $y_{max}$ in step S203, the CODE(i) is the character out of the region and step S216 follows and the value of i is increased by one. Then, the processing routine is returned to step S201 and the next character is processed. On the other hand, if y(i) is not smaller than $y_{min}$ and at the same time when y(i) is not larger than $y_{max}$, the CODE(i) is the character within the region and step S204 follows.

In steps S204 to S208, the CODE(i) is classified into either one of the decimal point ".", initial parenthesis "(", final parenthesis ")", lateral bar "–", root sign "√", and size-determined character and the processing routine is branched to step S211, S212, S213, S214, S215, and S209, respectively. After completion of each of these processes, step S216 follows and the value of i is increased by one. The processing routine is returned to step S201 and the next character is processed. However, in the case of the size-determined character, when the CODE(i) corresponds to the equality sign "=" in step S210, the formula recognition is finished.

Figure 19:
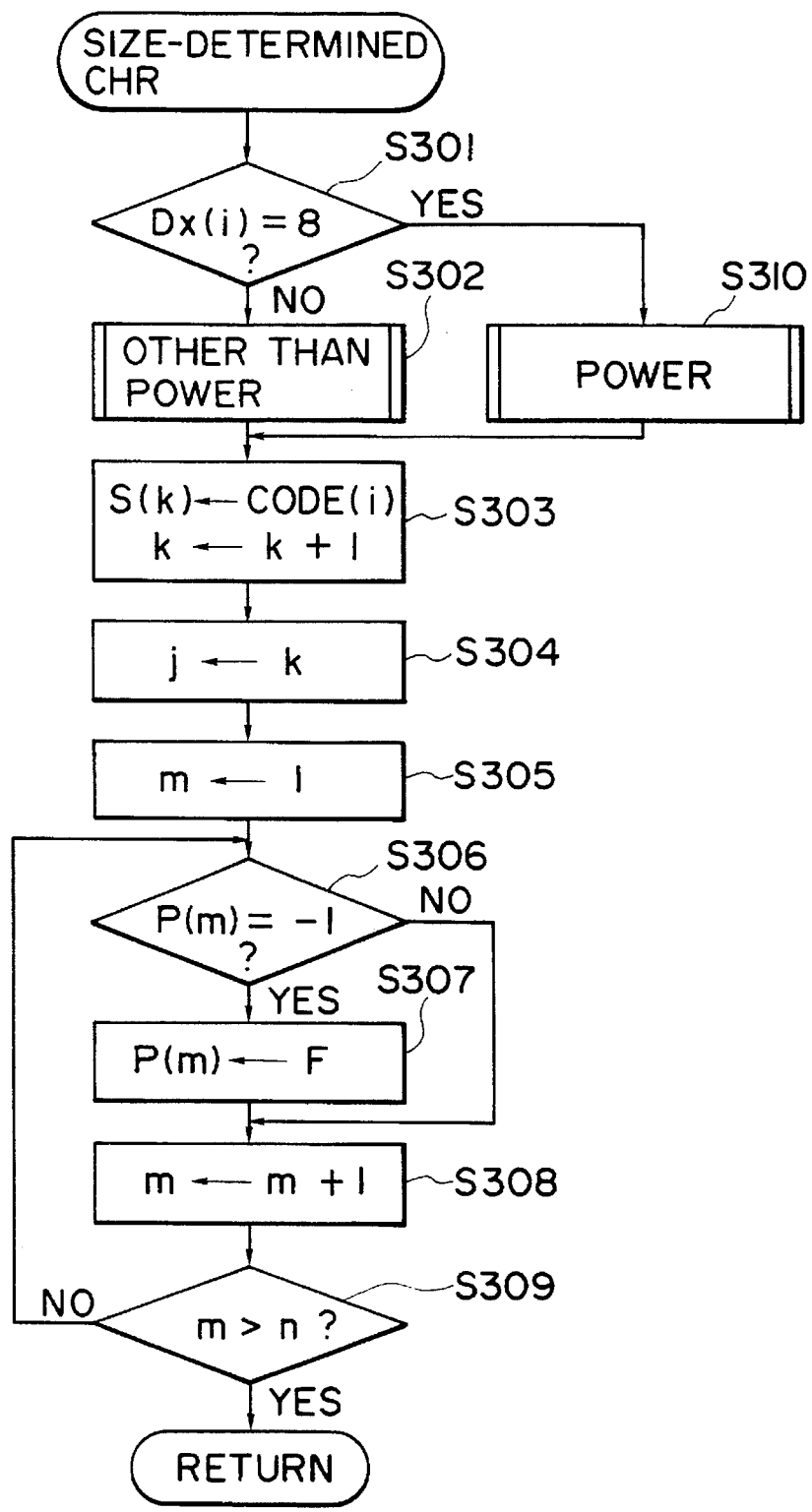
FIG. 19 is a flowchart for a processing routine of a size-determined character.

FIG. 19 shows a processing routine for the size-determined character in step S209 in FIG. 18.

In the first step S301, if $D_x(i)$ is 8, this means that the character corresponds to the 8-dot font. Therefore, it is the character in the power portion and step S310 follows. The process in step S310 is executed when the character in the power portion appears and will be explained in detail hereinafter with reference to FIG. 21.

Figure 21:
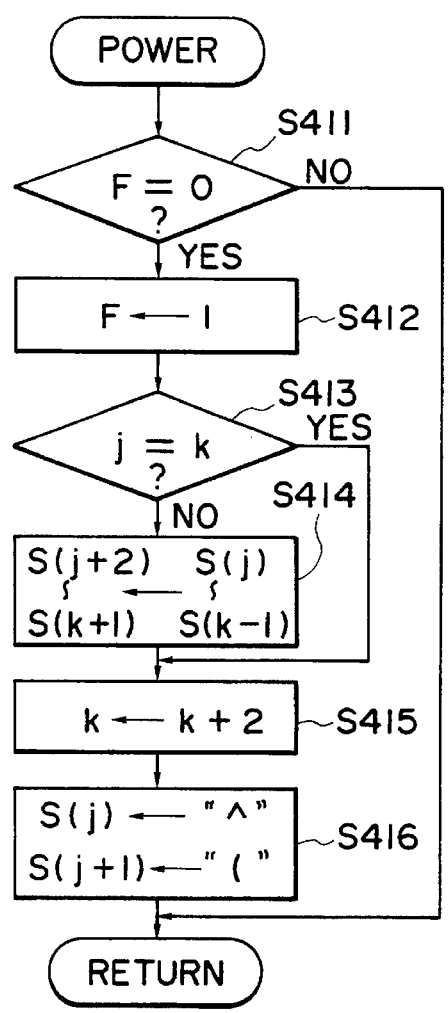
FIG. 21 is a flowchart for a processing routine of the portion in a power.

In step S411 in FIG. 21, if the variable F is 0, this means that the character to be processed is not the character other than the power but the character in the power portion. Therefore, in order to execute the processes to insert the character code "^" indicative of the power and the initial parenthesis "(" to sandwich the power portion, the processing routine advances to step S412 and subsequent steps. If the variable F is not 0, the processing routine is finished. In step S412, the variable F is set to 1 in order to store the fact that the character to be processed is the character in the power portion. In step S413, the variables j and k are compared. In the output code trains S(1), S(2), S(3), ..., for the code trains S(1) to S(j−1), it has already been decided whether the character to be processed is the character in the power portion or the character other than the power. On the other hand, for the code trains S(j) to S(k−1), the characters are the size-undetermined characters and the decision about whether the character to be processed is the character in the power portion or the character other than the power is deferred.

If j=k in this case, no deferred code exists and step S415 follows. On the contrary, if j≠k, the CODE(i) belongs to the portion in the power, so that the deferred code train also belongs to the portion in the power. Therefore, in step S414, in order to insert the character codes "^" and "(" into S(j) and S(j+1), the code trains which have already been input into S(j) to S(k−1) are transferred as a block to S(j+2) to S(k+1) and are shifted backward by two characters. In step S415, the variable k is increased by two since two characters were inserted. In step S416, the character code "^" is input to S(j) and the character code "(" is input to S(J+1), respectively.

On the other hand, in step S301 in FIG. 19, if $D_x(i)$ is not 8, the character code corresponds to the 16-dot font. Therefore, this means that the character is the character other than the power, so that step S302 follows. The process in step S302 is executed when a character other than the power appears. This process will be explained in detail with reference to FIG. 20.

Figure 20:
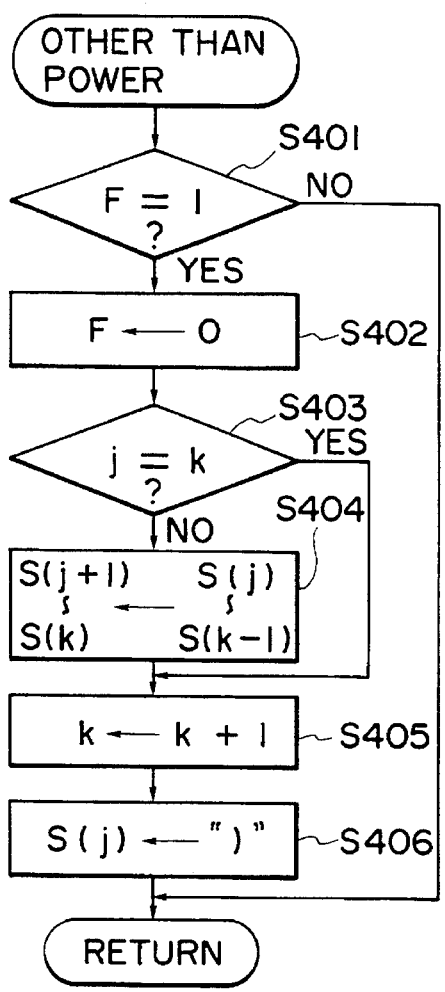
FIG. 20 is a flowchart for a processing routine of the portion other than a power.

In step S401 in FIG. 20, if the variable F is 1, this means that the character to be processed is not the character in the power portion but the character other than the power. Therefore, step S402 and subsequent steps follow in order to execute the process to insert the final parenthesis ")" to sandwich the power portion. If the variable F is not 1, the processing routine is finished. In step S402, the variable F is set to 0 in order to store the fact that the character to be processed is the character other than the power. In step S403, the variables j and k are compared. In the output code trains S(1), S(2), S(3), ..., for the code trains S(1) to S(j−1), it has already been decided whether the character to be processed is the character in the power portion or the character other than the power. On the other hand, for the code trains S(j) to S(k−1), the decision regarding whether the character to be processed is the character in the power portion or the character other than the power is deferred.

If j=k, no deferred code exists and step S405 follows. On the contrary, when j≠k, since the CODE(i) belongs to the portion other than the power, so that the deferred code train also belongs to the portion other than the power. Therefore, in order to insert the character code ")" into S(j), the code trains which have already been input into S(j) to S(k−1) are transferred as a block to S(j+1) to S(k) and are shifted by one character in step S404. In step S405, the variable k is increased by one since one character was inserted. In step S406, the character code ")" is inserted into s(j).

After completion of the process regarding the power in step S310 or S302 in FIG. 19, step S303 follows and the CODE(i) is input to S(k). The variable k is increased by one to indicate the inserting position of the next character code. In step S304, j is set to a value which is equal to k since at this time, it has been determined that all of the character codes in S(1) to S(k−1) relate to the characters in the power portion or the characters other than the power.

The processes in the next step S305 and subsequent steps are executed in order to memorize whether the initial parenthesis belongs to the portion in the power or the portion out of the power until the corresponding final parenthesis appears. The initial parenthesis is the size-undetermined character. When the initial parenthesis appears, the decision regarding whether it belongs to the portion in the power or the portion out of the power is deferred. When the size-determined character appears after that, the attribute is decided. Therefore, the attribute (about whether the character to be processed is the character in the power portion or the character other than the power) is memorized by the processes in step S305 and subsequent steps.

First, when the attribute of the initial parenthesis in which the number of stages of the nesting is set to m is deferred as will be explained hereinbelow, the attribute P(m) (hereinafter, the attribute is referred to as P and the attribute of the initial parenthesis of mth stage is referred to P(m)) is set to −1 representing that the decision regarding such an attribute is deferred. In step S305, the variable m is set to 1. In step S306, if the attribute P(m) is −1, by substituting the variable F to the attribute P(m) in step S307, the attribute of the initial parenthesis of the mth stage is stored in the attribute P(m). If the attribute P(m) is not −1, it is unchanged because the attribute has already been determined. In step S308, the variable m is increased by one. In step S309, the processes in step S306 and subsequent steps are repeated until the value of m exceeds the number n of stages of the newest initial parenthesis, so that the attributes of all of the initial parenthesis are stored. In this manner, the processes for the size-determined characters are finished.

Figure 22:
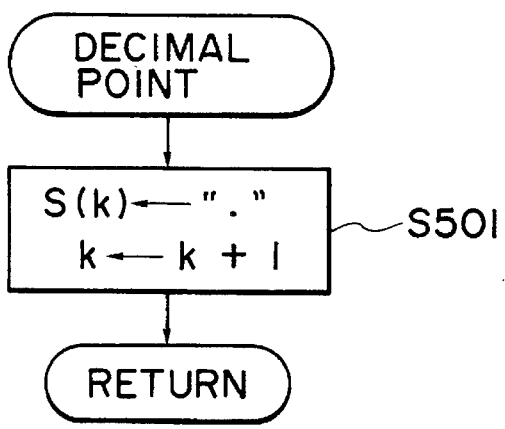
FIG. 22 is a flowchart for a processing routine of a decimal point.

FIG. 22 shows a processing routine of a decimal point in step S211 in FIG. 18. In step S501, the character code "." is input to S(k). The value of k is increased by one to indicate the inserting position of the next character code. However, the decimal point "." is the size-undetermined character and the decision with respect to whether the character to be processed belongs to the portion in the power or the portion out of the power is deferred. Therefore, the value of j is not increased but held as it is. j indicates the positions to insert the character codes "^" and "(" or the character code ")"

when the attribute is decided. In general, the value of k is increased by one each time the character code is input to S(k) and j is set to the same value as k after the size-determined character and final parenthesis were processed. The value of j is not changed in the other cases.

Figure 23:
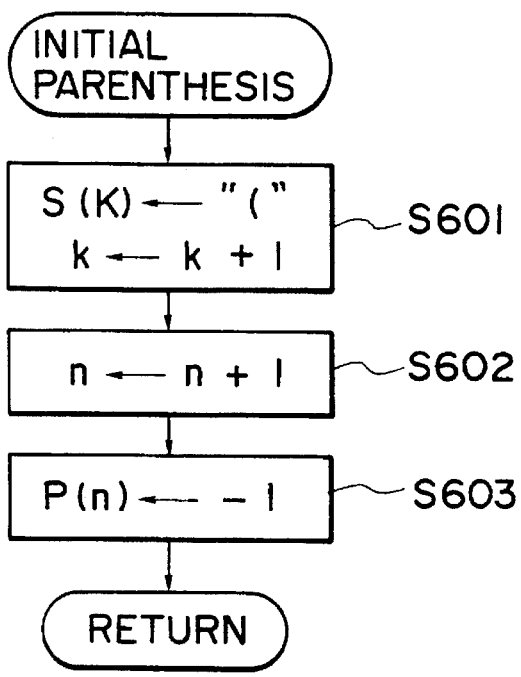
FIG. 23 is a flowchart for a processing routine of an initial parenthesis.

FIG. 23 shows a processing routine for the initial parenthesis in step S212 in FIG. 18. In step S601, the character code "(" is input to S(k). The value of k is increased by one to indicate the inserting position of the next character code. Since the initial parenthesis "(" is also the size-undetermined character, the attribute regarding the power is deferred. In step S602, the value of n is increased by one since the number of stages of the nesting is increased by one. In step S603, the attribute P(n) is decreased by one in order to memorize the fact that the attribute of the initial parenthesis has been deferred.

Figure 24:
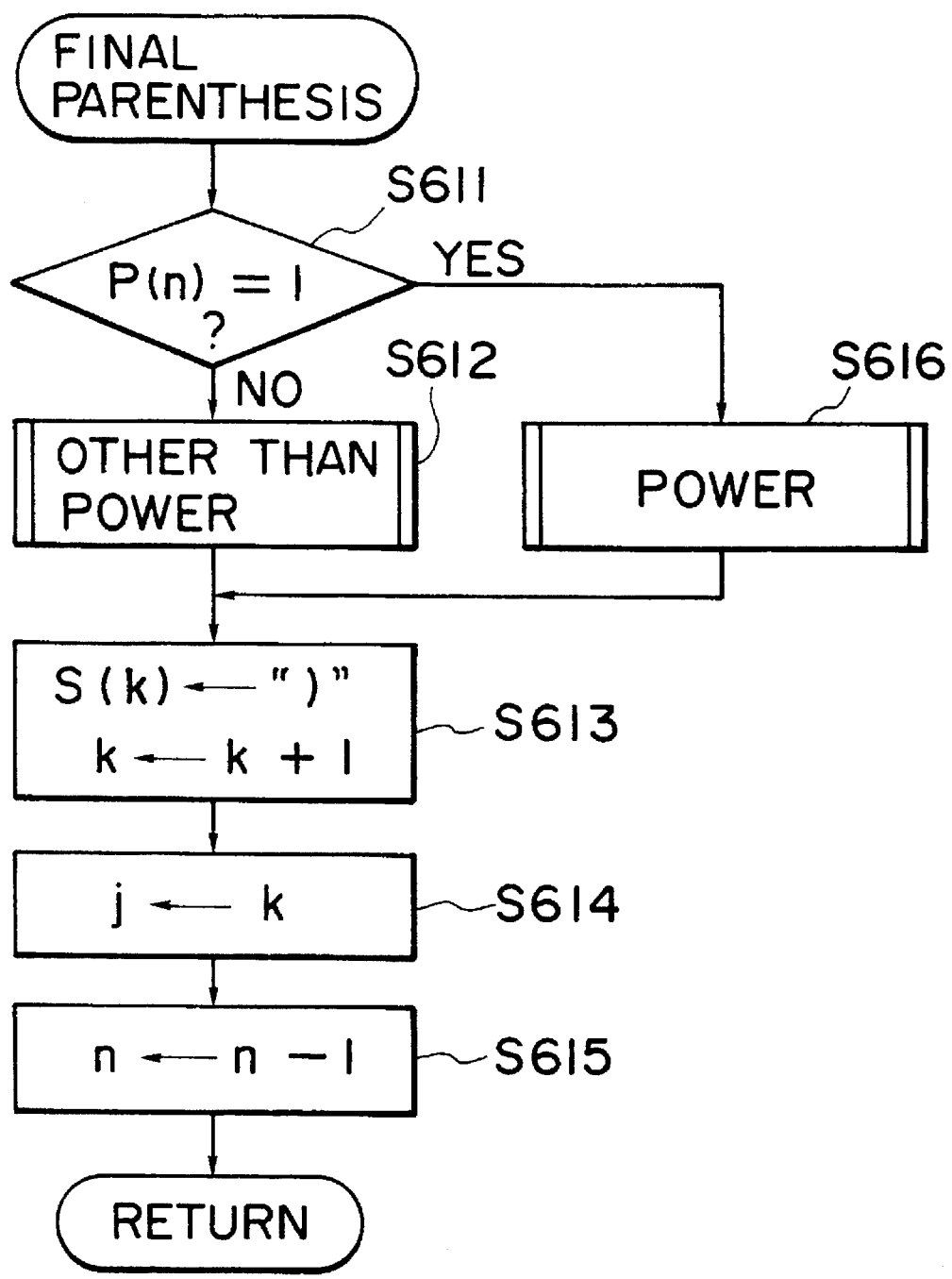
FIG. 24 is a flowchart for a processing routine of a final parenthesis.

FIG. 24 shows a processing routine for the final parenthesis in step S213 in FIG. 18. In step S611, if the attribute P(n) is set to 1, this means that the corresponding initial parenthesis belongs to the portion in the power, so that the final parenthesis also belongs to the portion in the power. The process of the portion in the power in FIG. 21 which has already been described is executed. On the other hand, if the attribute P(n) is not 1, this means that the corresponding initial parenthesis belongs to the portion out of the power. Therefore, the final parenthesis also belongs to the portion out of the power and the process of the portion other than the power is FIG. 29 which has already been described is executed. After completion of the respective processes, in step S613, the character code ")" is input to S(k). The value of k is increased by one to indicate the inserting position of the next character code. Although the final parenthesis ")" is the size-undetermined character, since the attribute regarding the power has been decided, j is set to the same value as k in step S614. In step S615, the value of n is decreased by one because the number of stages of the nesting is reduced by one.

Figure 25:
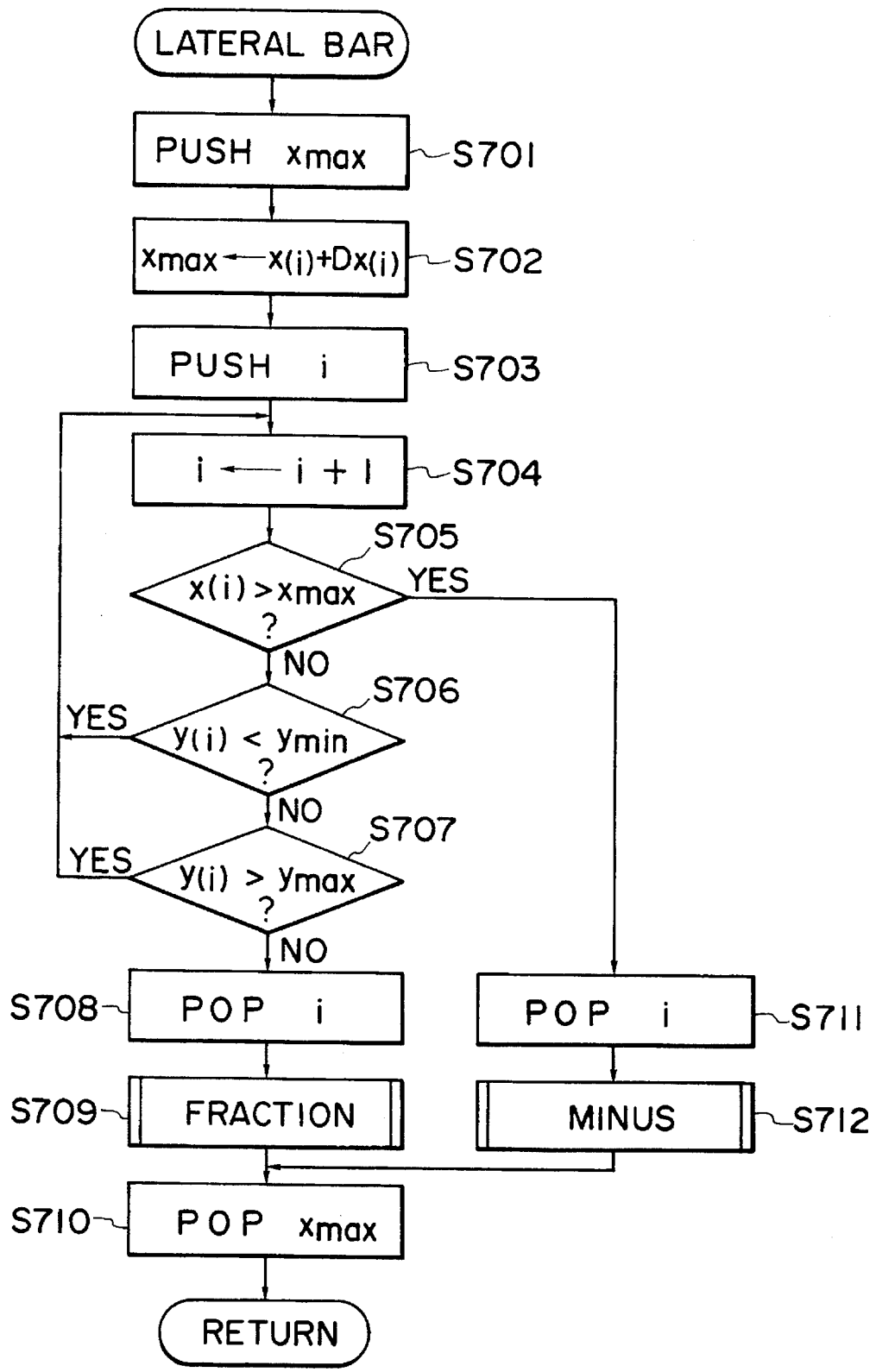
FIG. 25 is a flowchart for a processing routine of a lateral bar.

FIG. 25 shows a processing routine of the lateral bar in step S214 in FIG. 18. Steps S701 to S707 relate to the processes to check whether the lateral bar is the fraction bar or minus (hereinafter, both of the negative sign and the subtraction sign are generally referred to as a minus). First, in step S701, in order to store the value of $x_{max}$, it is pushed into the stack. In step S702, $x_{max}$ is set to $x(i)+D_x(i)$, namely, the x coordinate at the right end of the lateral bar. In the next step S703, in order to store the value of i, it is pushed into the stack. Subsequently, in step S704, the value of i is increased by one and the processing routine advances for the next character.

In step S705, with respect to the new i, if x(i) is not larger than $x_{max}$, step S706 follows. If y(i) is not smaller than $y_{min}$ in step S706 and when y(i) is not larger than $y_{max}$ in step S707, this means that the character is the character existing at the position of the numerator or denominator for the lateral bar. Therefore, the lateral bar is the fraction bar and step S708 follows. In step S708, i is returned to the lateral bar by popping the value of i from the stack. In step S709, the process for a fraction including the numerator and denominator is executed. In step S710, the region is returned to the original region by popping the value of $x_{max}$ from the stack.

On the other hand, when y(i) is smaller than $y_{min}$ in step S706 or if y(i) is larger than $y_{max}$ in step S707, the processing routine is returned to step S704 and the value of i is increased by one and the processing routine advances to the process for the next character. If x(i) is larger than $x_{max}$ in step S705 by repeating the processes in steps S704 to S707, this means that no character exists at the positions of the numerator and denominator for the lateral bar. Therefore, the lateral bar denotes the minus and step S711 follows. In step S711, i is returned to the lateral bar by popping the value of i from the stack. In step S712, the process for the minus is executed. In step S710, the region is returned to the original region by popping the value of $x_{max}$ from the stack.

Figure 26:
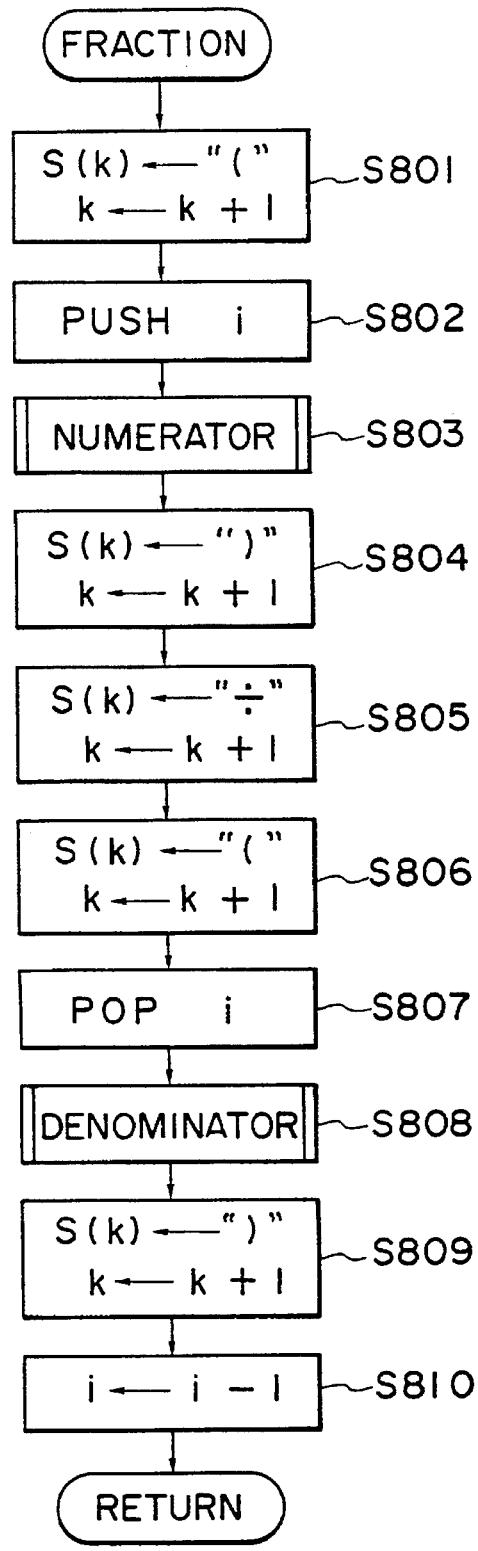
FIG. 26 is a flowchart for a processing routine of a fraction.

FIG. 26 shows a processing routine of the fraction in step S709 in FIG. 25. In the first step S801, the initial parenthesis "(" to sandwich the numerator is input to S(k). The value of k is increased by one to indicate the inserting position of the next character code. In the next step S802, to store the value of i, it is pushed into the stack. In step S803, the process for the numerator is executed. The processing routine for the numerator is shown in FIG. 27.

Figure 27:
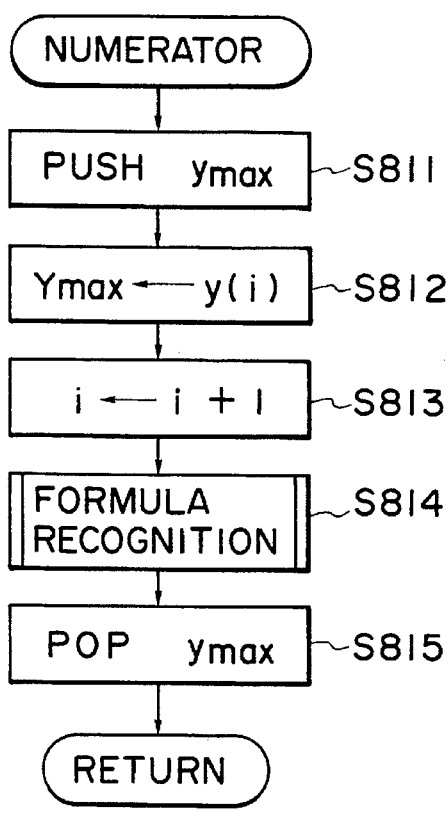
FIG. 27 is a flowchart for a processing routine of a numerator.

In FIG. 27, in the first step S811, to store the value of $y_{max}$, it is pushed into the stack. In the next step S812, $y_{max}$ is set to y(i), i.e., the y coordinate of the fraction bar. Next, the value of i is increased by one in step S813 and the processing routine advances to the process for the next character. In step S814, the formula recognition in FIG. 18 which has already been described is executed for the region of the numerator. After completion of the formula recognition, $y_{max}$ is popped from the stack and returned to the original value in step S815.

In FIG. 26, after completion of the process for the numerator in step S803, the final parenthesis ")" to sandwich the numerator is input to S(k) in step S804. The value k is increased by one to indicate the inserting position of the next character code. In the next step S805, the division sign "÷" is input to S(k). The value of k is increased by one. Further, in step S806, the initial parenthesis "(" to sandwich the denominator is input to S(k) and the value of k is increased by one. In the next step S807, i is returned to the lateral bar by popping the value of i from the stack. In step S808, the process for the denominator is exectued. The processing routine for the denominator is shown in FIG. 28.

Figure 28:
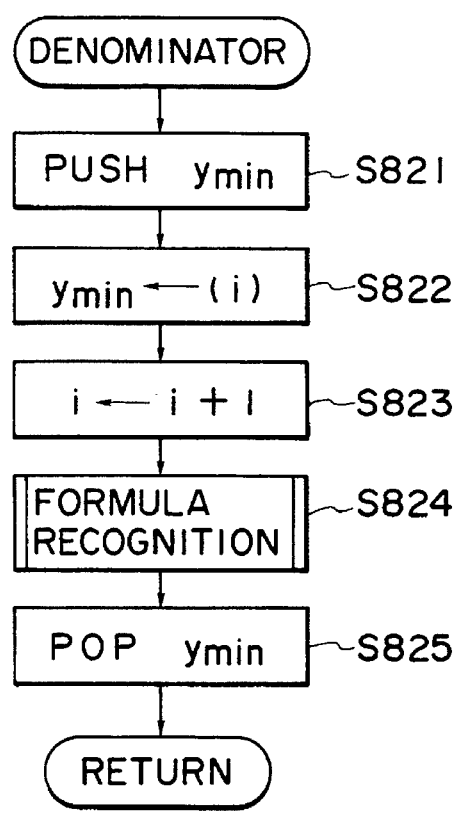
FIG. 28 is a flowchart for a processing routine of a denominator.

In FIG. 28, in the first step S821, to store the value of $y_{min}$, it is pushed into the stack. In step S822, $y_{min}$ is set to y(i), i.e., the y coordinate of the fraction bar. In the next step S823, the value of i is increased by one and the processing routine advances to the process for the next character. In step S824, the formula recognition in FIG. 18 which has already been described is executed for the region of the denominator. After completion of the formula recognition, in step S825, $y_{min}$ is popped from the stack and returned to the original value.

In FIG. 26, after completion of the process for the denominator in step S808, the final parenthesis ")" to sandwich the denominator is input to S(k) in step S809. The value of k is increased by one to indicate the inserting position of the next character code. The value of i indicates $x_{max}$, that is, the first character which exists on the right side than the right end of the fraction bar. This character is the character to be processed next after the process for the fraction was finished. However, since the value of i is increased by one in step S216 in FIG. 18, the value of i is previously reduced by one in step S810. Thus, after completion of the process for the fraction, the character to be processed next is set to the first character locating on the right side than the right end of the fraction bar.

Figure 29:
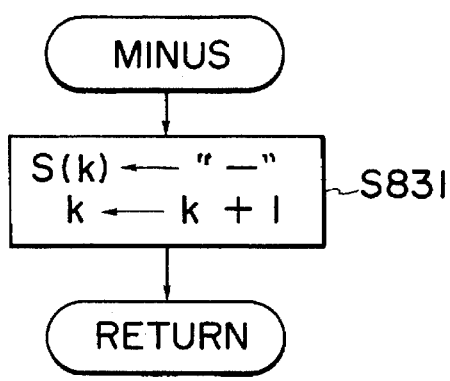
FIG. 29 is a flowchart for a processing routine of a minus sign.

FIG. 29 shows a processing routine for the minus in step S712 in FIG. 25. In step S831, the character code "−" is input to S(k). At this time point, the character code "−" is not the fraction bar but denotes the minus. The value of k is increased by one to indicate the inserting position of the next character code. The decision regarding whether the character to be processed belongs to the portion in the power or the portion out of the power is deferred.

Figure 30:
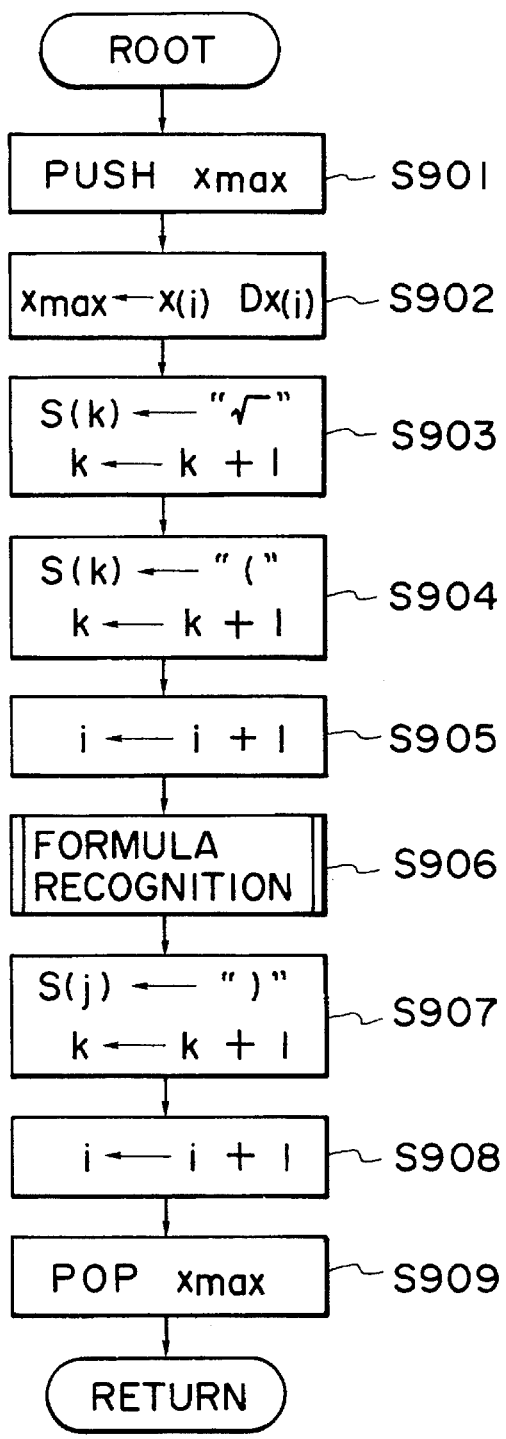
FIG. 30 is a flowchart for a processing routine of a square root.

Lastly, FIG. 30 shows a processing routine for the square root in step S215 in FIG. 18. In the first step S901, to store the value of $x_{max}$, it is pushed into the stack. In the next step S902, $x_{max}$ is set to $x(i) + D_x(i)$, namely, the x coordinate at the right edge of the root sign. Then, the root sign "√" is input to S(k) in step S903. The value of k is increased by one to indicate the inserting position of the next character code. Subsequently, the initial parenthesis "(" to sandwich the portion in the root sign is input to S(k) in step S904 and the value of k is increased by one. Next, the value of i is increased by one in step S905 and the processing routine advances to the process for the next character.

In step S906, the formula recognition in FIG. 18 which has already been described is executed for the region in the root sign. After completion of the formula recognition, step S907 follows and the final parenthesis ")" to sandwich the portion in the root sign is input to S(k) and the value of k is increased by one. The value of i indicates $x_{max}$, namely, the first character which exists on the right side than the right end of the root sign. This character is the character to be processed next after the process for the square root was finished. However, since the value of i is increased by one in step S216 in FIG. 18, the value of i is previously decreased by one in step S908. Thus, after the process for the square root was finished, the character to be processed next is set to the first character locating on the right side than the right end of the root sign. In step S909, by popping x from the stack, the region is returned to the original region. As mentioned above, the code trains S(1), S(2), S(3), . . . are produced.

As described above, the computer using the numerical expression recognizing apparatus shown in the embodiment can input numerical expressions of fraciton, power, square root, and the like on the basis of the expression which are ordinarily used in the mathematics. Therefore, the troublesomeness such that the human being converts a form of a numerical expression in accordance with the specification of the machine and then inputs as in the conventional computer becomes unnecessary and a numerical expression can be easily input. In addition, since the handwritten coordinates input apparatus of the input/output integrated type is used, the input numerical expression can be directly seen and can be certainly input.

A numerical expression recognizing apparatus of another embodiment of the invention will now be described. A hardware arrangement of this apparatus is the same as that in the foregoing first embodiment. The input apparatus 1 in FIG. 1(A) has the same function as that in the first embodiment. The handwritten CHR recognition circuit 21 in the second embodiment recognizes alphabetical characters "A" to "Z", a defining sign "≡", and a substituting sign "+" in addition to the characters shown in FIG. 2.

The alphabetical characters "A" to "Z" are the size-determined characters which are used as variable names and function names. The defining sign "≡" is used when a numerical expression is defined as a function. The substituting sign "→" is used when a numerical value is substituted for a variable. The defining sign and substituting sign are the size-determined characters in which the 16-dot fonts are always selected in the same manner as the code "=".

In the second embodiment, by recognizing alphabetical characters, the alphabetical characters can be used as variable names and function names for a numerical expression. When either one of the equality sign "=", defining sign "≡", and substituting sign "→" is input after the numerical expression, the numerical expression recognition circuit 22 recognizes the numerical expression. The alphabetical characters are processed in a manner similar to the numerals and are directly included in the code trains and output.

If the defining sign "≡" was input after the numerical expresison, the code train is defined as a function which is expressed by the alphabetical character written on the right side adjacent to the defining sign "≡". At this stage, no arithmetic operation is executed but the code train including the alphabetical characters is stored as it is in the RAM 28.

On the other hand, if the substituting sign "→" or equality sign "=" was input after the numerical expression, the arithmetic operation is executed by the arithmetic operation circuit 23 for the code train which was output by the numerical expression recognition circuit 22. If a variable is included in the numerical expression, the arithmetic operation is executed by the numerical value substituted for this variable. On the other hand, if a function is included in the numerical expression, the arithmetic operation is performed by setting the numerical value obtained by calculating the numerical expression defined in this function as a value of the function, thereby obtaining the solution. If the substituting sign "→" was input after the numerical expression, the solution obtained is substituted for the variable which is expressed by one alphabetical character written on the right side adjacent to the substituting sign "→" and the resultant data is stored in the RAM 28. If the equality sign "=" was input after the numerical expression, the foregoing solution is displayed on the LCD 13 by the display control circuit 24.

In the ordinary expression in the mathematics, the multiplication sign "×" just before the alphabetical character, initial parenthesis "(" and root sign "√" can be omitted. Therefore, when these characters appear, if a necessary operator does not exist just before them, the arithmetic operation circuit 23 regards as if the multiplication sign was omitted and executes the multiplication. The multiplication from which the multiplication sign was omitted has the higher priority of the arithmetic operation than that of the multiplication using the multiplication sign "×" or that of the division using the division sign "÷" and has the lower priority than that of the arithmetic operation using a power.

Figure 31:
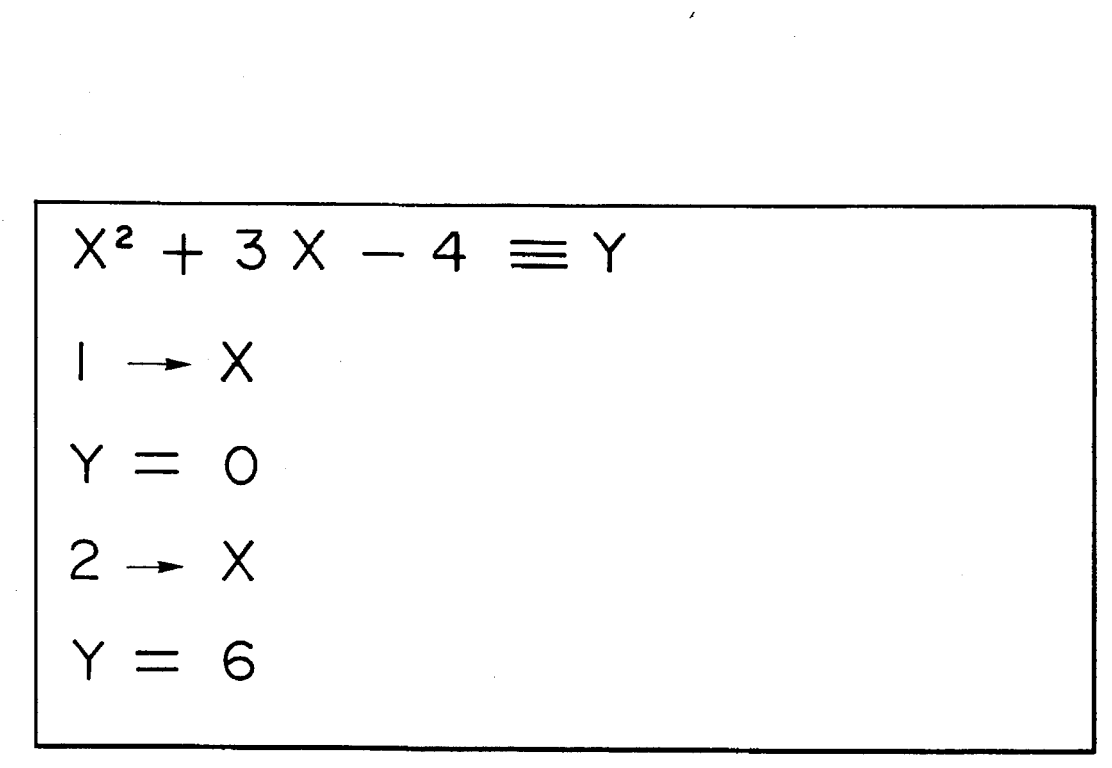

FIG. 31 shows an example of the calculation using a variable and a function. First, by inputting $X^2+3X-4\equiv Y$, the numerical expression of $X^2+3X-4$ is defined as a function Y.

Next, by inputting $1\rightarrow X$, the numerical value 1 is substituted for the variable X.

By inputting Y=, the value of X in $X^2+3X-4$ is calculated as 1 and the solution "0" is displayed.

Subsequently, by inputting $2\rightarrow X$, the numerical value 2 is substituted for the variable X.

By inputting Y=, the value of X in $X^2+3X-4$ is calculated as 2 and the solution "6" is displayed. In this manner, by sequentially changing the value of X in the function Y, the values of Y for X are calculated.

As mentioned above, by recognizing the numerical expression including the numerical value or the character corresponding to the arithmetic operation and by defining the code train output as a function, the calculation can be executed many times by again using the numerical expression which has once been input. The invention can be widely applied to program calculations or the like.

The code train output by the handwritten numerical expression recognizing apparatus can be easily converted into a form of a computer language such as BASIC, FORTRAN, or the like. The numerical expression which was input by this apparatus can be also used by other computers.

As described above, since a numerical expression can be input by the same operations as those when a human being writes it on a paper by the hand, even a person who is inexperienced in the operation of the machine can easily perform these operations.

On the other hand, by outputting not only the code of each written character but also the coordinate information such as positional relation among the characters, the sizes thereof, and the like, a numerical expression such as a fraction, a power, a square root, or the like can be directly input on the basis of the expression which are ordinarily used in mathematics. Therefore, the troublesomeness such that after a human being converted the numerical expression in accordance with the specification of the machine, he inputs the converted numerical expression, becomes unnecessary. The numerical expression can be easily input.

Further, the numerical expression which was input on the basis of the expression, which is ordinarily used in the mathematics is recognized by the machine and the code train such that the arithmetic operation can be performed by the arithmetic operation circuit, can be output. Therefore, the invention can be widely applied as an apparatus for inputting a numerical expression to an information processing apparatus which processes a numerical expression.

Although a numerical expression has been input by the pen in this embodiment, the input means is not limited to the pen but a numerical expression can be also easily input by using a keyboard, a mouse, an ODR, or the like. Further, as mentioned first, the result of the recognition is not limited to only the use for the arithmetic operation but the numerical expression which has once been recognized can be also used for the conversion into other numerical expression, the production of a new numerical expression, or the like. In addition, only a part of operators have been shown in the embodiment and other operators can be also easily recognized according to the embodiment.

According to the present invention, it is possible to provide a numerical expression recognizing apparatus in which a numerical expression written on a paper or the like is directly recognized and output as a code train.

In more detail, since a numerical expression can be input by the same operations as those when a human being writes it on a paper, even a person who is inexperienced in the operation of the machine can easily input a numerical expression. On the other hand, since a numerical expression such as a fraction, a power, a square root, or the like can be input on the basis of an expression which is ordinarily used in mathematics, the troublesomeness, such that after a human being converted the numerical expression in accordance with the specification of a machine, he inputs the converted numerical expression, becomes unnecessary. The numerical expression can be easily input. Further, the numerical expression which was input, on the basis of an expression which is ordinarily used in the mathematics is recognized by the machine and the code train such that the arithmetic operation can be performed by the arithmetic operation circuit, can be output. Thus, the invention can be widely applied as an apparatus for inputting a numerical expression to an information processing apparatus which processes the numerical expression.

What is claimed is:

1. A numerical expression recognizing apparatus comprising:

input means for inputting a numerical expression consisting of characters including numerals and signs by coordinates and by character sizes;

dictionary means for storing a pattern of a character and identification information indicating whether the stored pattern is that of a size-determined character or a size-undetermined character;

recognizing means for recognizing the characters including the numerals and signs input by said input means, wherein said recognizing means recognizes whether a character input by said input means represents an exponent on the basis of the size of the input character;

discriminating means for discriminating whether each character recognized by said recognizing means is a size-determined character or a size-undetermined character on the basis of the identification information previously set in said dictionary means in correspondence to the recognized character; and comparing means for comparing the coordinates of the character discriminated as a size-undetermined character by said discriminating means and other characters.

2. An apparatus according to claim 1, wherein said recognizing means has means for converting the characters constituting the numerical expression which were input by said input means into the code information.

3. An apparatus according to claim 1, further comprising output control means for outputting a pattern of the numerical expression constituted by the characters on the basis of coordinates and character sizes input by said input means and the characters recognized by said recognizing means.

4. An apparatus according to claim 3, wherein said output control means has display means for displaying the pattern of the numerical expression.

5. An apparatus according to claim 1, wherein said recognizing means recognizes a lateral bar as a fraction bar, when there are characters at the position of a numerator and a denominator with respect to the lateral bar, and as a minus sign when there are no such characters at said positions.

6. A numerical expression recognizing apparatus comprising:

input means for inputting a numerical expression consisting of characters including numerals and signs by coordinates and by character sizes;

storage means for storing a pattern of a character and identification information indicating whether the stored pattern is that of a size-determined character or a size-undetermined characters;

recognizing means for recognizing the characters including the numerals and signs input by said input means, wherein said recognizing means recognizes a lateral bar as a fraction bar, when there are characters at the positions of a numerator and a denominator with respect to the lateral bar, and as a minus signal when there are no such characters at said positions;

discriminating means for discriminating whether each character recognized by said recognizing means is a size-determined character or a size-undetermined character on the basis of the identification information previously set in said storage means in correspondence to the recognized character;

comparing means for comparing the coordinates of the character by said discriminating means and other characters; and calculating means for calculating the result of an arithmetic operation of the numerical expression constructed by the characters recognized by said recognizing means, the numerical expression being determined responsive to the relative position of the character with respect to the other characters obtained based on a comparison performed by said comparing means.

7. A numerical expression recognizing apparatus comprising:

input means for inputting a numerical expression consisting of characters including numerals and signs by coordinates and by character sizes;

storage means for storing a pattern of a character and identification information indicating whether the stored pattern is that of a size-determined character or a size-undetermined character;

recognizing means for recognizing the characters including the numerals and signs input by said input means, wherein said recognizing means recognizes a character input by said input means represents an exponent on the basis of the size of the input character;

discriminating means for discriminating whether each character recognized by said recognizing means is a size-determined character or a size-undetermined character on the basis of the identification information previously set in said storage means in correspondence to the recognized character;

comparing means for comparing the coordinates of the character discriminated as a size-undetermined character by said discriminating means and other characters; and calculating means for calculating the result of an arithmetic operation of the numerical expression constructed by the characters recognized by said recognizing means, the numerical expression being determined responsive to the relative position of the character with respect to the other characters obtained based on a comparison performed by said comparing means.

8. A numerical expression recognizing method using a pattern of a character stored in a dictionary and identification information stored in the dictionary indicating whether the stored pattern is that of a size-determined character or a size-undetermined character, comprising the steps of:

inputting a numerical expression consisting of characters including numerals and signs;

recognizing the characters including the numerals and signs input in said inputting step, wherein said recognizing step comprises the step of recognizing a lateral bar as a fraction bar, when there are characters at the position of a numerator and a denominator with respect to the lateral bar, and as a minus sign when there are no such characters at said positions;

discriminating whether each character recognized in said recognizing step is a size-determined character or a size-undetermined character on the basis of the identification information stored in the dictionary, wherein the discrimination is made using a table in which it is previously set whether each character is a size-determined character or a size-undetermined character; and comparing the coordinates of the character discriminated as a size-undetermined character in said discriminating step and other characters.

9. An apparatus according to claim 6 or 7, wherein said recognizing means has means for converting the characters constructing the numerical expression which were input by said input means into code information.

10. A numerical expression recognizing method using a pattern of a character stored in a dictionary and identification information stored in the dictionary indicating whether the stored pattern is that of a size-determine character or a size-undetermined character, comprising the steps of:

inputting a numerical expression consisting of characters including numerals and signs;

recognizing the characters including the numerals and signs input in said inputting step, wherein said recognizing step comprises the step of recognizing whether a character input in said inputting step represents an exponent on the basis of the size of the input character;

discriminating whether each character recognized in said recognizing step is a size-determined character or a size-undetermined character on the basis of the identification information stored in the dictionary, wherein the discrimination is made using a table in which it is previously set whether each character is a size-determined character or a size-undetermined character; and comparing the coordinates of the character discriminated as a size-undetermined character in said discriminating step and other characters.

11. A numerical expression recognizing method using a pattern of a character stored in storage means and identification information indicating whether the stored pattern is that of a size-determined character or a size-undetermined character stored in the storage means, comprising the steps of:

inputting a numerical expression consisting of characters including numerals and signs by coordinates and by character sizes;

recognizing the characters including the numerals and signs input in said inputting step, wherein said recognizing step comprises the step of recognizing a lateral bar as a fraction bar, when there are characters at the positions of a numerator and a denominator with respect to the lateral bar, and as a minus signal when there are no such characters at said positions;

discriminating whether each character recognized in said recognizing step is a size-determined character or a size-undetermined character on the basis of the identification information stored in the storage means, wherein the discrimination is made using a table in which it is previously set whether each character is a size-determined character or a size-undetermined character;

comparing the coordinates of the character discriminated as a size-undetermined character in said discriminating step and other characters; and calculating the result of an arithmetic operation of the numerical expression constructed by the characters recognized in said recognizing step, the numerical expression being determined responsive to a relative position of the character with respect to the other characters obtained based on a comparison performed in said comparing step.

12. A numerical expression recognizing method using a pattern of a character stored in storage means and identification information indicating whether the stored pattern is that of a size-determined character or a size-undetermined character stored in the storage means, comprising the steps of:

inputting a numerical expression consisting of characters including numerals and signs by coordinates and by character sizes;

recognizing the characters including the numerals and signs input in said inputting step, wherein said recognizing step comprises the step of recognizing a character input in said inputting step represents an exponent on the basis of the size of the input character;

discriminating whether each character recognized in said recognizing step is a size-determined character or a size-undetermined character on the basis of the identification information stored in the storage means, wherein the discrimination is made using a table in which it is previously set whether each character is a size-determined character or a size-undetermined character;

comparing the coordinates of the character discriminated as a size-undetermined character in said discriminating step and other characters; and calculating the result of an arithmetic operation of the numerical expression constructed by the characters recognized in said recognizing step, the numerical expression being determined responsive to a relative position of the character with respect to the other characters obtained based on a comparison performed in said comparing step.

13. An apparatus according to claim 1, 6, or 7, wherein said apparatus is used in an input/output apparatus comprising a tablet and a display device overlaid on each other.

14. A method according to claim 8, 10, 11, or 12, wherein said method is carried out in an input/output apparatus comprising a tablet and a display device overlaid on each other.

15. An apparatus according to claim 1, 6, or 7, wherein said input means inputs the numerical expression using a tablet.

16. A method according to claim 8, 10, 11, or 12, wherein said input step inputs the numerical expression using a tablet.

17. An apparatus according to claim 1, 6, or 7, wherein the numerical expression input by said input means comprises coordinate data.

18. A method according to claim 8, 10, 11, or 12, wherein the input numerical expression comprises coordinate data.

19. An apparatus according to claim 1, wherein said output control means has display means for displaying both of the numerical expression and the pattern of the numerical expression as the result of the arithmetic operation.

20. An apparatus according to claim 6 or 7, further comprising output control means for outputting a pattern of the numerical expression constituted by the characters on the basis of coordinates and character sizes input by said input means and the characters recognized by said recognizing means.

21. A method according to claim 8 or 10, wherein said recognizing step comprises the step of converting the characters constituting the numerical expression which were input in said inputting step into code information.

22. A method according to claim 8 or 10, further comprising the step of outputting a pattern of the numerical expression constituted by the characters on the basis of coordinates and character sizes input in said inputting step and the characters recognized in said recognizing step.

23. A method according to claim 22, wherein said outputting step comprises the step of displaying the pattern of the numerical expression.

24. A method according to claim 11 or 12, wherein said recognizing step comprises the step of converting the characters constructing the numerical expression which were input in said inputting step into code information.

25. A method according to claim 11 or 12, further comprising the step of outputting a pattern of the numerical expression constituted by the characters on the basis of coordinates and character sizes input in said inputting and the characters recognized in said recognizing step.

26. A method according to claim 25, wherein said outputting step comprises the step of displaying both of the numerical expression and the pattern of the numerical expression as the result of the arithmetic operation.

* * * * *

UNITED STATES PATENT AND TRADEMARK OFFICE
CERTIFICATE OF CORRECTION

PATENT NO. : 5,481,626
DATED : January 2, 1996
INVENTOR(S) : Kazuhiro MATSUBAYASHI It is certified that error appears in the above-indentified patent and that said Letters Patent is hereby corrected as shown below:

On title page and column 1, line 1,
[54] Title:

"REOGNIZING" should read --RECOGNIZING--.

COLUMN 4:

Line 12, ""X";" (first occurrence) should read --"+";--.
Line 60, "$Y_{max}$," should read --$y_{max}$,--.

COLUMN 5:

Line 28, "on the" should read --by-- and after "written", "by" should read --on--.
Line 29, "the" should be deleted.

COLUMN 8:

Line 34, "$Y_{max}$." should read --$y_{max}$.--.

COLUMN 13:

Line 34, "fraciton," should read --fraction--.
Line 65, ""5"," should read --"$\equiv$",--.

UNITED STATES PATENT AND TRADEMARK OFFICE
CERTIFICATE OF CORRECTION

PATENT NO. : 5,481,626
DATED : January 2, 1996
INVENTOR(S) : Kazuhiro MATSUBAYASHI It is certified that error appears in the above-indentified patent and that said Letters Patent is hereby corrected as shown below:

COLUMN 14:

Line 4, ""5"" should read --"≡"--.

COLUMN 16:

Line 15, "the" should be deleted.

COLUMN 17:

Line 58, "size-determine" should read --size-determined--.

Column 19,
CLAIM 19:

Line 33, "claim 1," should read --claim 20,--.

Signed and Sealed this

Ninth Day of July, 1996

BRUCE LEHMAN

Attest:

Attesting Officer  Commissioner of Patents and Trademarks